United States Patent [19]
Mayer

[11] 3,879,146

[45] *Apr. 22, 1975

[54] JOINT

[76] Inventor: Otto Mayer, Muhlstrasse 76, D-7067 Pluderhausen, Germany

[ * ] Notice: The portion of the term of this patent subsequent to Feb. 21, 1989, has been disclaimed.

[22] Filed: Jan. 13, 1972

[21] Appl. No.: 217,498

[30] Foreign Application Priority Data
Jan. 15, 1971 Germany............................ 2101915

[52] U.S. Cl. .................................. 403/93; 16/144
[51] Int. Cl. ............................................. F16c 11/00
[58] Field of Search ........ 287/14, 99; 297/367, 365; 16/144; 403/93, 102

[56] References Cited
UNITED STATES PATENTS

| | | | |
|---|---|---|---|
| 2,594,533 | 4/1952 | Baker | 287/14 UX |
| 2,812,961 | 11/1957 | Brown et al. | 287/99 |
| 3,304,107 | 2/1967 | Bahmuller | 287/99 |
| 3,643,292 | 2/1972 | Mayer | 16/144 |

Primary Examiner—Andrew V. Kundrat
Attorney, Agent, or Firm—Allison C. Collard

[57] ABSTRACT

A joint having two arms which are pivotable with respect to each other about a common axis, and lockable in at least one predetermined angular position, having a locking member mounted on one arm for radical movement with respect to the joint axis, at least one notch provided on the second arm in a peripheral edge extending concentrically to the joint axis, a spring biasing the locking member towards said peripheral edge, and an unlocking lever pivoted about the joint axis and provided with a substantially eccentric cam facing the locking member and intersecting the peripheral edge of said second arm, wherein the cam merges radially outside the peripheral edge into an end portion which intersects the path of movement of the locking member at right angles when the unlocking lever is disposed in an unlocked position.

4 Claims, 20 Drawing Figures

JOINT

This invention relates to a joint having two arms which pivot with respect to each other about a common axis, and lock in at least one predetermined angular position. A locking member or bolt is mounted on one arm for radial movement with respect to the joint axis, and at least one notch provided on the second arm in a peripheral edge, extending concentrically to the joint axis. A spring urges the bolt toward the peripheral edge, and an unlocking lever which is pivotal about the joint axis relative to the joint arms, and provided with a substantially eccentric cam, facing the bolt and intersecting the peripheral edge.

These joints are used, for example, as joints for ladders having a plurality of relatively pivotal sections, so that the ladder may be used as an extended straight ladder, as trestles with one fold, or as a working platform with two folds. It can be folded together in compact manner. In addition, joints of this type may be used for camp beds, collapsible perambulators, and adjustable seat backs and the like. When the joint is unlocked, the two legs connected to the joint arms are pivoted with respect to each other. In ladders, the two legs must be held by hand and it is therefore not possible to additionally hold the unlocking lever in its unlocking position. Thus, for a practical joint construction, it must be ensured that after unlocking, the joint retains its unlocked condition until at least the next joint position when the locking position is reached. With ladders, the joint should lock automatically in this next position, when the ladder is opened from its folded condition, to exclude the possibility of a joint remaining unintentionally unlocked. On the other hand, when the ladder is collapsed, it is advantageous if the individual ladder sections can be pivoted from any desired locked operative position into the completely collapsed position without the ladder locking again in each intermediate position, so as to aid the folding operation. If the joint is to be moved from a further opened position into an operative position nearer the folded position, the ladder can first be folded together and then correspondingly opened again.

In a conventional joint construction attempting to meet the above requirements, in addition to an unlocking lever, a further lever is provided which, under the influence of the unlocking lever during the unlocking operation, moves into the path of the bolt and initially prevents the latter from re-entering the notch. However, this additional locking lever increases the cost of the joint construction, and in addition, makes the mode of operation of the joint relatively complicated.

The present invention provides a particularly simple and reliable construction which meets the aforementioned requirements, using a minimum number of components. In the invention, it is unnecessary to have a separate locking lever holding the locking member or bolt in its unlocked position when the joint pivots, since the bolt remains in its unlocked position at least until the second arm has pivoted sufficiently so that the bolt can not enter the notch. In the invention, the cam merges radially outside the peripheral edge into an end portion which intersects the path of movement of the bolt at right angles when the unlocking lever is in the unlocking position.

In another embodiment, the control curve comprises a lift portion which in the locked condition of the joint faces the notch and increases eccentrically its center distance. At the outside of the peripheral edge, the control curve passes through a point of maximum center distance and then in a blocking portion remote from the notch in the locked condition of the joint. The center distance again decreases to form a cam, and the unlocking movement of the unlocking lever relative to the second joint arm is limited in such a manner that the blocking portion, on reaching the end position of the unlocking lever in its unlocking position, faces the notch in the region where the notch crosses the peripheral edge radially outwardly.

An advantage of the first embodiment is that the unlocking lever, in its unlocking position, bears on the first joint arm in the direction of its unlocking movement, and is frictionally connected to the second joint arm. A plurality of notches are formed in the peripheral edge of the second joint arm.

In a further embodiment, the unlocking lever is frictionally connected to the second joint arm. In its unlocking position, it bears on the second joint arm in the direction of its unlocking movement. The peripheral edge of the second joint arm is provided with a plurality of notches, and a cam, comprising an end portion, is associated with each notch.

In still another advantageous embodiment, the unlocking lever in its locking position bears in the direction opposite to its unlocking movement on the second joint arm. The unlocking lever is frictionally connected to the second joint arm and in its unlocking position, bears with a stop provided on the end of the end portion of the cam in the direction of the unlocking movement on the bolt. At the peripheral edge of the second joint arm there is associated with the stop, a cam-like projection which extends radially further from the joint axis than the stop at the end of the cam, and it is disposed in such a manner that with the joint unlocked and on pivotal movement of the second joint arm directed against the unlocking lever said projection reaches the region of the bolt before the second joint arm reaches the unlocking lever.

In another embodiment, the peripheral edge of the second joint arm has a plurality of notches, each having an associated cam with stop on the unlocking lever, and a camlike projection on the peripheral edge.

In another embodiment, the unlocking lever and the second joint arm are frictionally connected together. The peripheral edge of the second joint arm has a notch, associated with each end position, and at least one intermediate position of the joint. A stop on the second joint arm is associated with the unlocking lever, and on the unlocking lever, two cams are oppositely formed in such a manner that their end portions are adjacent to each other. The end portion of the first cam has a larger distance from the center of the joint axis than the end portion of the second cam so that between the two end portions, a radial stop edge is formed facing the second cam. In this one end position, the first cam bears on the bolt when the second joint arm is in the intermediate position following the one end position. The unlocking lever bears on the end portion of the first cam associated with the bolt. At the peripheral edge of the second joint arm, there is associated with the end portion of the first cam, a cam-like projection which extends radially further from the joint axis than the end portion of the first cam. The first cam is disposed in such a manner that with the joint unlocked, and upon pivotal movement of the second joint arm directed against the unlocking lever, the projection reaches the region of the bolt before the second joint arm reaches the unlocking lever.

The invention will be explained in detail hereinafter with reference to the examples of embodiment illustrated in the drawings. In the drawings, wherein similar reference characters denote similar elements throughout the several views.

Figure 1:
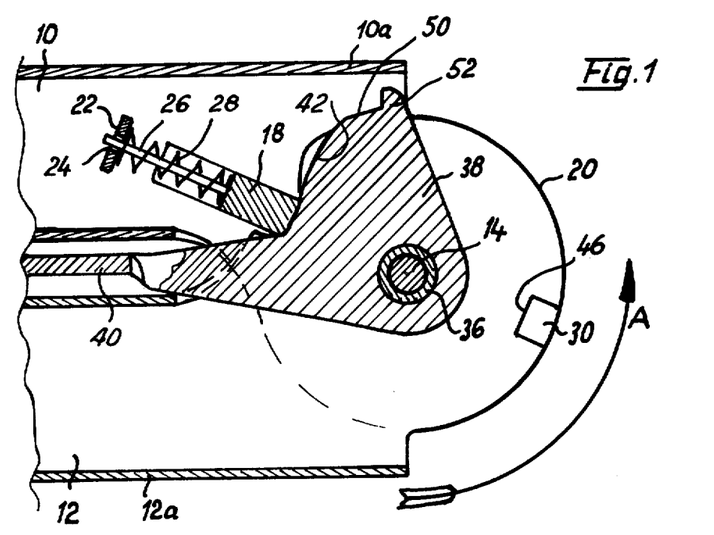
FIG. 1 is a cross-sectional view through a first embodiment of a ladder joint according to the invention, in the collapsed position.
Figure 2:
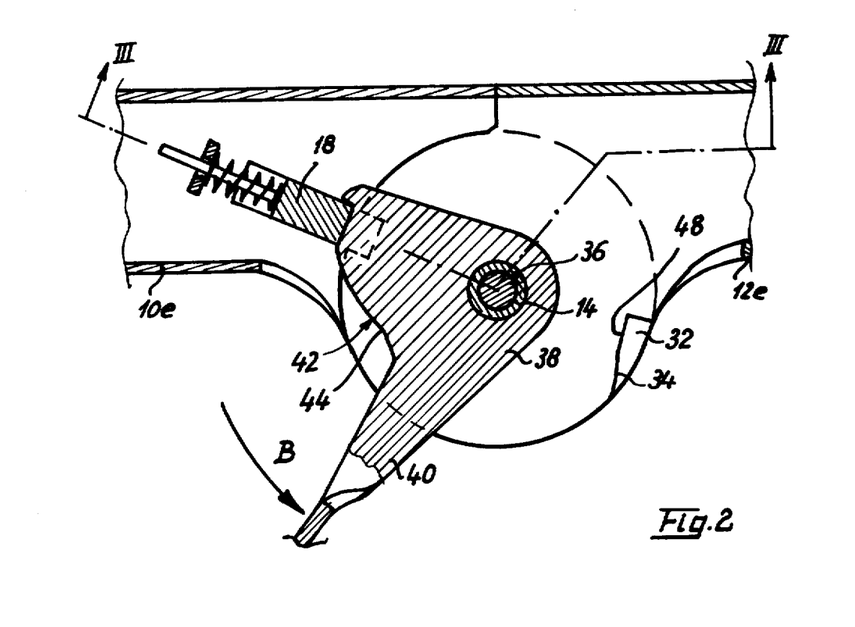
FIG. 2 is a section through the joint of FIG. 1 with the joint fully expanded, and in the unlocked position.
Figure 3:
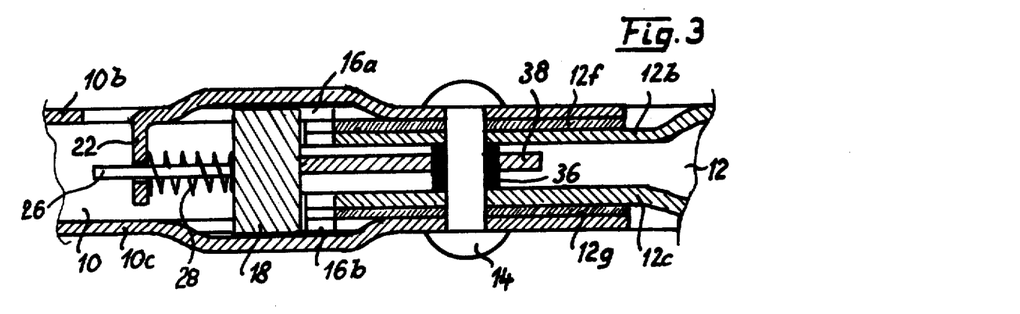
FIG. 3 is an axial section taken along line III—III of FIG. 2.

Referring to FIGS. 1-3, the ladder joint illustrated represents the simplest form of embodiment wherein the joint has only two end positions, i.e., the collapsed position of FIG. 1 and the fully opened position of FIG. 2. The opened position represents the operative position in which the joint may be automatically locked. The first joint arm 10 and the second joint arm 12 are made in a well known manner from hollow sheet-metal bodies in such a manner that they form two side cheeks 10b, 10c and 12b, 12c (FIG. 3) connected together by an upper web 10a and 12a respectively. The lower ends 10d, 10e and 12d, 12e of the side cheeks are bent inwardly towards each other in each case so that a box-shaped profile of joint arms 10 and 12 is obtained. The two joint arms are mounted pivotably about a common axis 14. A rivet connecting arms 10 and 12 together serves as the joint axis. In the region of axis 14, side cheeks 10b, 10c and 12b, 12c of the joint arms 10 and 12 are widened at their side remote from upper web 10a and 12a respectively, to give a disc shape concentric with axis 14. The width of second joint arm 12 in the region of said disc-shaped portions is smaller than that of first arm 10, so that the latter outwardly encloses second arm 12 more clearly seen in FIG. 3. Disposed between adjacent side cheeks 10b, 12b and 10c, 12c of arms 10 and 12 are reinforcing discs 12f and 12g respectively, which are of substantially circular shape, concentric to axis 14 and fixedly connected to side cheeks 12b and 12c of the second arm.

Side cheeks 10b and 10c of first arm 10 are provided with guides 16a and 16b (FIG. 3) for a locking member or bolt 18, the guide extending radially with respect to axis 14. Guides 16a and 16b extend sufficiently toward axis 14 to project inwardly beyond the substantially circular peripheral edge 20 of second arm 12, and reinforcing discs 12f and 12g connected thereto, so that bolt 18 can enter notches formed in peripheral edge 20. A tab serving as abutment 22 is pressed out of side cheek 10b, towards the other side cheek 10c. Abutment 22 is provided with a bore 24 in which a rod-like spring guide 26 is radially displaceable with respect to axis 14. Spring guide 26 is connected to the side of bolt 18, remote from axis 14, and is surrounded between abutment 22 and bolt 18 by a helical pressure spring 28, which urges bolt 18 against peripheral edge 20.

Formed in peripheral edge 20 is a notch 30 which, in the operative lockable position of the joint, is directed radially towards bolt 18, so that the latter can enter notch 30 under the action of helical pressure spring 28. Notch 30 is adapted to the outline of bolt 18 so that the engagement is substantially without play.

A second notch 32 is disposed in peripheral edge 20 so that when the joint is fully collapsed, the notch is opposite bolt 18. The rear flank 34, responsive to the opening movement of the second joint arm relative to the first arm, is bevelled so that during the opening movement, the bolt can slide along flank 34, and is pressed radially outwardly against the action of pressure spring 28 until the bolts bears on peripheral edge 20.

Disposed between side cheeks 12b and 12c, and placed about the rivet serving as joint axis 14, is a spacer bushing 36 on which an unlockingg lever 38 is mounted in a loosely pivotally manner. The width of the spacer bushing is slightly greater than that of unlocking lever 38 so that the latter is independent of the movement of arm 12. Lever 38 projects with a grip 40 downwardly from the joint so that in the collapsed condition of the joint, grip 40 lies between arms 10 and 12. Grip 40 is disposed in the path of the lower ends 12d or 12e of arm 12. Within the joint, lever 38 is constructed in the form of circular sector whose peripheral face forms aas eccentric cam 42 as best seen in FIG. 2. The portion 44 of cam 42 adjacent to grip 40 is radially spaced from axis 14 a distance which is equal to, but preferably somewhat less than the radial distance of inner end 46 of notch 30, or the inner end 48 of second notch 32. From portion 44, the radial distance of cam 42 from axis 14 gradually increases until in the final portion 50, (FIG. 1) it is somewhat greater than the radius of peripheral edge 20. End portion 50 extends substantially tangential, and is limited at the end by a stop nose 52. With respect to the cam, "tangential" means that in its end portion at the greatest distance from axis 14, the cam forms a tangent to a circle concentric with the axis, having this greatest distance as radius. Alternatively, the end portion of the cam may extend concentrically to the axis instead of tangentially. The purpose of this construction is to offer the bolt disposed in the unlocking position a support surface at right-angles to the radial line of action of the bolt bias, so that no force component can arise to transmit a torque about the axis to the unlocking lever at the support surface.

When the joint is opened from the position shown in FIG. 1 in the direction of the arrow A by pivoting second arm 12 relatively to first arm 10, inclined flank 34 of second notch 32 is moved past bolt 18 and lifts the latter radially outwardly until it finally bears on peripheral edge 20. During the further pivotal movement of the second arm 12, bolt 18 slides along the peripheral edge until the joint reaches its fully opened position and notch 30 enters the region of bolt 18. Since unlocking lever 38 is not influenced by the movement of second arm 12, it remains stationary relative to arm 10, in the position shown in FIG. 1, in which grip 40 extends substantially parallel to first arm 10. Consequently, cam 42 does not prevent bolt 18 from entering notch 30 under the action of spring 28 as soon as notch 30 reaches the region of bolt 18. The joint is thus automatically locked as soon as a completely opened operative position is reached.

If unlocking lever 38 has unintentionally moved out of its rest position shown in FIG. 1 during the opening movement, it will be pushed back into its rest position when bolt 18 enters notch 30 since as this happens, the bolt would slide along cam 42 and thus press the unlocking lever back.

If the joint is to be collapsed from a fully opened position (FIG. 2) unlocking lever 38 is pivoted in the direction of the arrow B into the position shown in FIG. 2 so that the bolt is pressed into its unlocking position and finally bears on end portion 50 of the cam. The second joint arm can now be pivoted back into the position shown in FIG. 1 without having to hold the unlocking lever. In the course of the pivoting movement, second arm 12 engages lever 38 and moves it into the position shown in FIG. 1.

A stop nose 52 limits the movement of the unlocking lever in the direction of arrow B, the fixed stop indicating that the effective unlocking position has been reached. Unintentional unlocking is difficult since in the locked position, grip 40 extends closely adjacent and substantially parallel to first arm 10.

Figure 4:
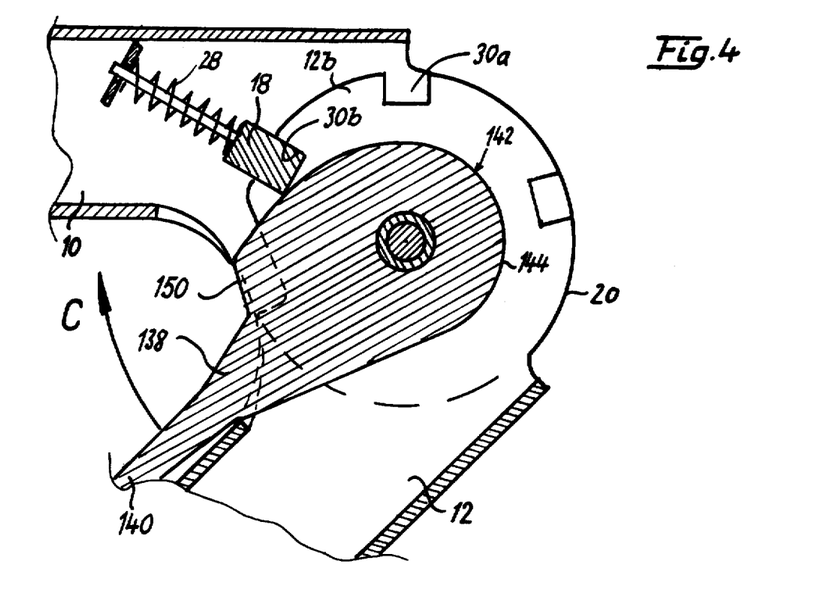
FIG. 4 is a cross-sectional view through a second form of embodiment of a ladder joint according to the invention in a trestle position, and in the locked condition.
Figure 5:
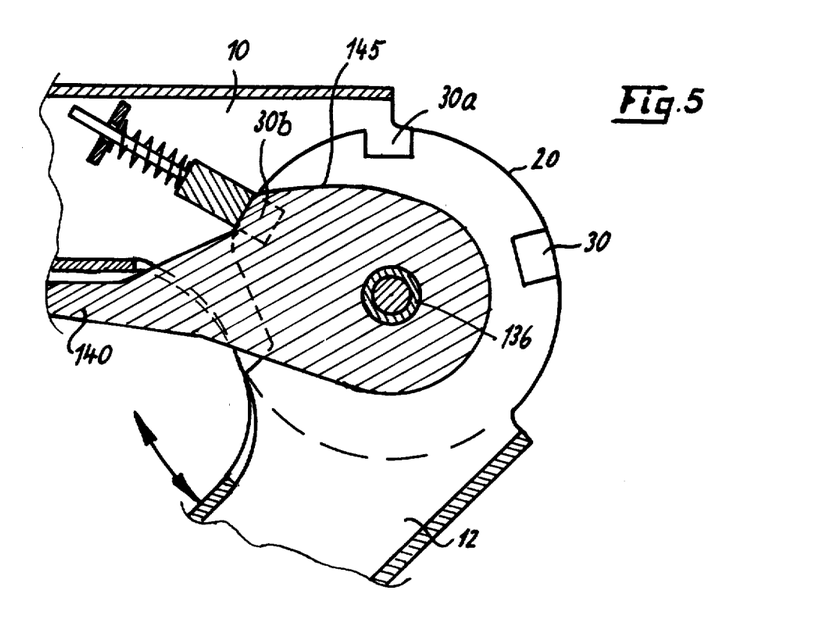
FIG. 5 shows the joint of FIG. 4 in the same position and unlocked.

The construction shown in FIGS. 4 and 5 corresponds substantially to the construction just described but with the difference that instead of a single lockable joint position, several such positions may be provided. In ladder joints, the joint is locked during the opening movement in every position reached in which a notch is provided. After actuation, the unlocking lever can be further pivoted into the next operative position in which the bolt can again automatically engage. On the other hand, the joint may be completely collapsed from every locked operative position reached by a single actuation of the unlocking lever.

In FIGS. 4 and 5, joint arms 10 and 12, bolt 18, abutment 22, pressure spring 28 and reinforcing discs 12f and 12g are constructed substantially the same as in the construction of FIGS. 1–3. Formed in peripheral edge 20 is lever radius than slightly beyond a notch 30 associated with the extended joint position, and two further notches 30a and 30b intended to lock the joint in intermediate position.

Figure 11:
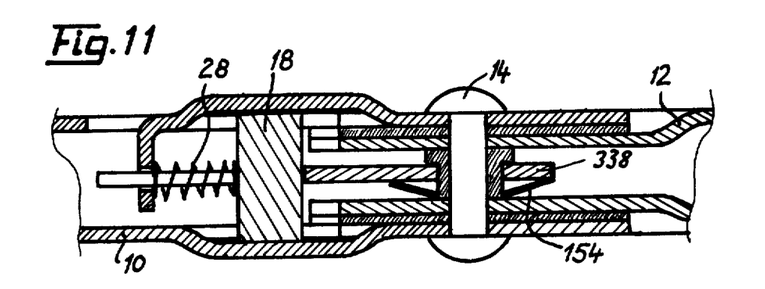
FIG. 11 shows an axial section taken along line XI—XI of FIG. 10.

Unlocking lever 138 is mounted on a spacer bushing 136 whose form is substantially apparent from FIG. 11. Unlocking lever 138 does not pivot independently of second arm 12. A disc spring (not shown in FIGS. 4 and 5) is inserted between the unlocking lever 138 and one side cheek 12c to establish a frictional connection between unlocking lever 138 and arm 12 so that the unlocking lever constantly tends to participate in any movement of second arm 12 about axis 14. In addition, in its rest position, grip 140 extends parallel to second arm 12 and is closely adjacent to the latter. Release levere 138 is also provided with a cam 142, the latter having a concentric portion 144 with a smaller radium thatn that of the inner ends of the notches 30, 30a and 30b. An eccentric portion 145 extends outwardly, sligfhtly beyone peripheral edge 20 and an end portion 150. End portion 150 also extends concentrically to axis 14.

When the joint is in a completely collapsed position corresponding to FIG. 1, grip 140 lies substantially parallel to both arms 10 and 12, and is thus disposed in the position shown in FIG. 5 relative to arm 10. In this position, bolt 18 lies on end portion 150 and is thus prevented from radial movement against peripheral edge 20. In this position, the joint may be opened at any time by pivoting second arm 12 relative to first arm 10 in the counter-clockwise direction. Due to the frictional coupling between unlocking lever 138 and second arm 12, lever 138 participates in this pivotal movement so that bolt 18 moves radially inwardly along eccentric cam portion 145 until it bears on peripheral edge 20. When notch 30b comes into the region of bolt 18, it enters the notch and automatically locks the joint in the position as shown in FIG. 4. If this is not the desired operative position of the joint, unlocking lever 138 is pivoted in the direction of arrow C in FIG. 4 against first arm 10. Eccentric portion 145 then presses bolt 18 outwardly until the latter bears on end portion 150. Arm 12 can then be further pivoted counter-clockwise until the next notch 30a reaches the region of bolt 18. Bolt 18 enters this notch since unlocking lever 138 has pivoted into its inoperative position by the frictional connection. If it is desired to bypass this operative position, unlocking lever 138 is again pivoted blockwise when looking at FIG. 4. until it bears on first arm 10, whereupon second arm 12 can be further pivoted into the extended end position in which bolt 18 engages in notch 30. It is apparent from this explanation that the number of intermediate positions may be increased as desired withhout altering the mode of operation.

After unlocking lever 138 pivots against first arm 10, arm 12 may be moved into the fully collapsed initial position, from any of the locked positions. When second arm 12 moves in the clockwise direction, unlocking lever 138 is held in its position shown in FIG. 5.

Consequently, as either notches 30a or 30b, or both, move under bolt 18, a locking engagement is prevented by the position of release lever 138.

Figure 6:
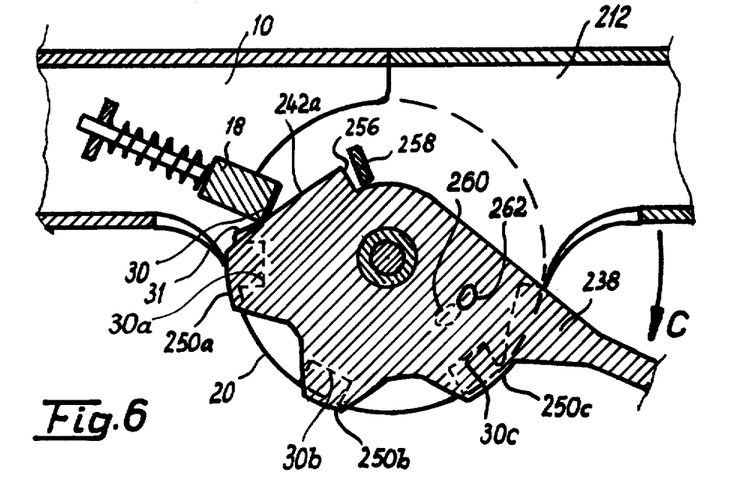
FIG. 6 shows a further embodiment in the extended position and locked condition.
Figure 7:
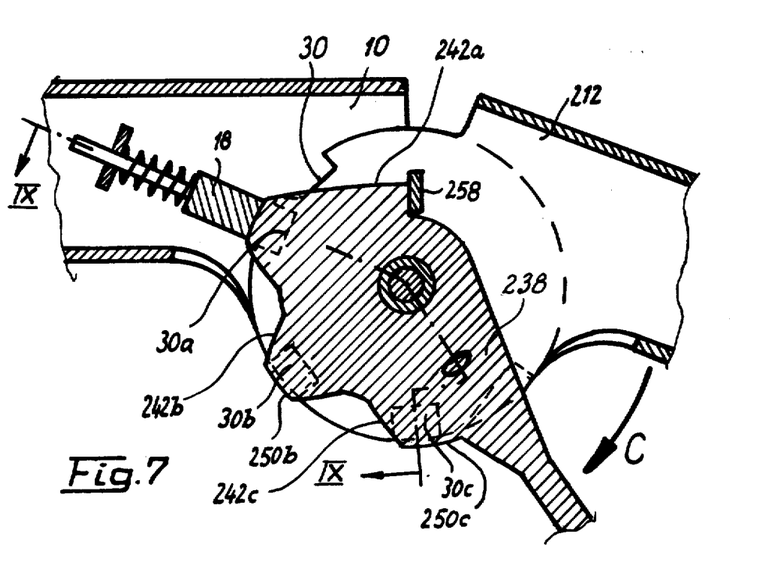
FIG. 7 shows the joint of FIG. 6 unlocked and undergoing a pivoting movement into the collapsed position.

Referring now to FIGS. 6–9, a lockable hinge joint is provided wherein the locking action occurs during collapse or folding from the extended position. Thus, the locking sequence is opposite to that above-described for FIGS. 4–5. Components identical or similar to those in the preceding embodiments are again denoted by the same reference numerals. As apparent from FIGS. 6, 7 and 8, unlocking lever 238 has a substantially different form. A stop edge 256 is provided which is associated with a stop 258 disposed on the second joint arm 212. Three portions 250a, 250b and 250c are provided and each extends radially outside peripheral edge 20. In the unlocking position of lever 238, (FIG. 7) the portions coincide with the notches 30a, 30b and 30c. Inclined flanks 242a, 242b, and 242c slope from their respective portions 250a, 250b and 250c as seen in FIG. 7. These flanks urge bolt 18 radially outwardly into its unlocked position during the unlocking movement. The bolt remains in this position on either of portions 250a, 250b or 250c. In this unlocking position, lever 238 is prevented from any further movement in the direction of arrow C by the cooperation of stop edge 256 and stop 258.

Figure 9:
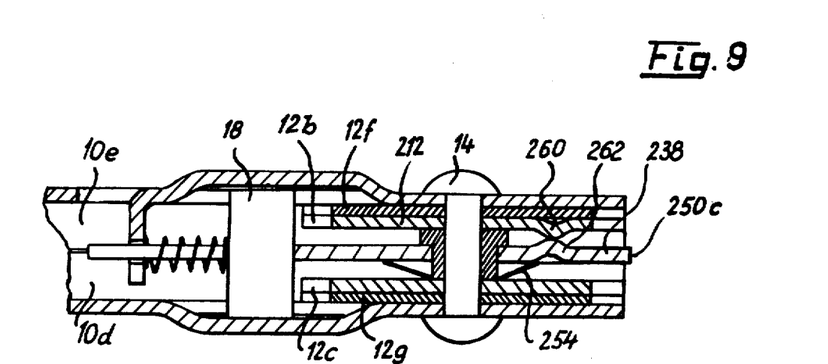
FIG. 9 shows the joint of FIGS. 6-8 in axial section taken along line IX—IX of FIG. 7.

It is apparent from FIG. 9 that unlocking lever 238 is pressed by a disc spring 254 against side cheek 12b of second joint arm 212. Side cheek 12b is provided withh an axially inwardly projecting protrusion 260 with which is associated a corresponding protrusion 262 on unlocking lever 238. In the locked position shown in FIG. 6, protrusions 260 and 262 are not in contact and consequently there is only a slight frictional entrainment between second arm 212 and the unlocking lever 238 under the influence of disc spring 254. On the other hand, if unlocking lever 238 is pivoted into the unlocking position shown in FIG. 7, protrusions 260 and 262 coincide and the disc spring is thus compressed to a greater extent, thereby increasing the frictional entrainment between arm 212 and unlocking lever 238. As a result, after unlocking and pivoting second arm 212 in the direction of arrow C, i.e., in the direction of the collapsed joint position, unlocking lever 238 retains its position relative to second arm 212 and participates in the pivotal movement thereof with respect to first arm 10 until flank 242a pivots out of the extended position, and flanks 242b or 242c pivot out of the next joint to meet bolt 118 sliding along peripheral edge 20. A further pivotal movement of lever 238 in the direction of arrow C is thus prevented. Notches 30a, 30b and 30c thereby leave the region of portions 250a to 250c covering them so that when arm 212 is pivoted in direction C, it always locks in the next joint position as soon as the corresponding notch has reached the region of bolt 18. Bolt 18 is pressed under the influence of pressure spring 28 into notches 30a to 30c. Bolt 18 slides along one of flanks 242a to 242c and in this manner, presses against unlocking lever 238 for movement in the reverse direction of arrow C back into its rest position.

Figure 8:
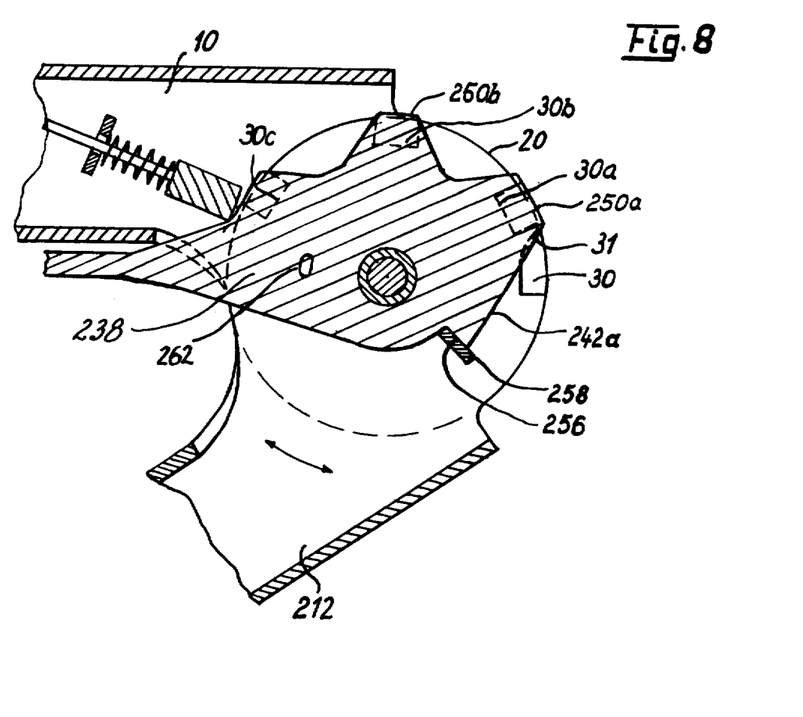
FIG. 8 shows the joint of FIGS. 6 and 7 in an unlocked trestle position.

FIG. 8 shows a joint position in which the joint has been unlocked by pivoting unlocking lever 238 to remove bolt 18 after it had been in notch 30c. Second joint arm 212 may now be pivoted against first joint arm 10. The same position is also reached if second arm 212 is to be pivoted out of the completely collapsed position into the extended position. As is apparent from FIG. 8, this is the position in which protrusion 260 in side cheek 12b comes into contact with protrusion 262 of unlocking lever 238, which until then, has not participated in the pivotal movement of second arm 212. In addition, in the position shown in FIG. 8, stop 258 bears on edge 256 of unlocking lever 238 so that when the joint is opened further, the lever is operatively entrained until second arm 212 has reached the position (of FIG. 6) shown in FIG. 6. In this position, bolt 18 snaps into notch 30 without the pivoting of lever 238 against second arm 212. It will then be apparent that thhe joint position obtained, while securely locked from counterclockwise rotation as viewed in FIG. 6, is free to rotate in a clockwise direction.

The ability to rotate in the clockwise direction when looking at FIG. 6 results since bolt 18 in notch 30 bears only one side of a radial flank and thus effects a secure operative locking in the direction opposite to arrow C. On the other hand, in the direction of arrow C, second arm 212 may be pivoted if a force is applied to overcome the radial force component of pressure spring 28. Inclined flank 31 of notch 30 then moves under bolt 18 and presees the latter radially outward against the action of spring 28 until bolt 18 finally rests on peripheral edge 20. As this happens, bolt 18, then bearing on flank 242a of unlocking lever 238, pushes the unlocking lever so that latter frees notch 30a into which bolt 18 snaps as soon as second arm 212 has reached the corresponding position.

This joint construction is thereof suitable for applications where secure locking on both sides, or in both directions of rotation is necessary in the intermediate positions but not in the end positions. The pivoting from the end positions is possible without actuating the unlocking lever simply by overcoming a light catch action.

Figure 10:
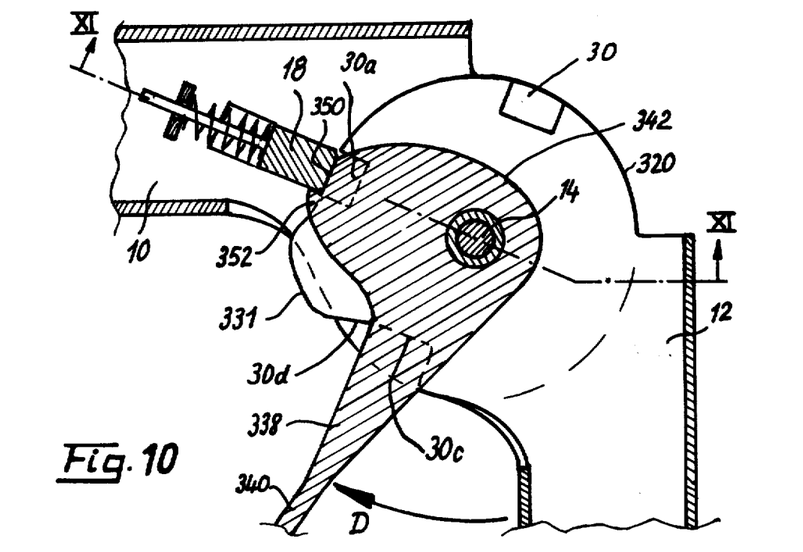
FIG. 10 shows a different form of an embodiment in cross-section and unlocked.

FIGS. 10 and 11 show a joint having two lockable positions for which notches 30 and 30a are provided. In addition, a notch 30c is provided into which bolt 18 can drop in the collapsed joint position. As is apparent from FIG. 11, in a manner similar to that in FIG. 9, a disc spring 154 establishes a frictional connection between unlocking lever 338 and second joint arm 12, the resulting frictional entrainment being uniform over the entire pivotal range. Unlocking lever 338 includes a cam 342 which extends eccentrically from a region within peripheral edge 320 up to an end portion 350 which advantageously has a slightly greater radius to axis 14 and circular peripheral edge 320, and extends substantially tangentially with respect to the axis. End portion 350 is limited at its side remote from cam 342 by stop nose 352 having a substantially radially extending stop face. Between notch 30c associated with the collapsed joint position, and notch 30a associated with the intermediate position shown in FIG. 10 is a camlike projection 331 whose center distance from axis 14 is somewhat greater than that of stop nose 352 on unlocking lever 338.

FIG. 10 shows an intermediate position of the joint after the unlocking. To lift bolt 18 from notch 30a, unlocking lever 338 has been pivoted in the direction of arrow D so that cam 342 has raised bolt 18 to bear on end portion 350 so that second arm 12 can move freely into the collapsed position. The frictional entrainment of unlocking lever 338 is first prevented by stop nose 352 bearing on bolt 18. However, when the joint is folded together, unlocking lever 338 must be pivoted up to first arm 10. Camlike projection 331 raises bolt 18 further so that nose 352 can be pivoted under bolt 18. To pivot the joint out of the position shown in FIG. 10 and into a fully extended position, second arm 12 must be pivoted counter-clockwise relative to first arm 10. Unlocking lever 338 participates in this pivoting movement so that bolt 18 can slide along peripheral edge 320 and finally drop into notch 30. To unlock the joint in the extended position, unlocking lever 338 must be pivoted in the direction of arrow D until stop nose 352 meets bolt 18. The joint can now be pivoted freely into its fully collapsed position because cam-like projection 331 does not lift bolt 18 until notch 30*a* has passed bolt 18 in the manner already described, thus enabling further pivoting of unlocking lever 338. If the joint is to be opened from the collapsed position, unlocking lever 338, which lies in the collapsed position, with grip 340 substantially parallel to second arm 12, is entrained, by the frictional connection in this relative position to the second arm so that bolt 18 will at first freely engage notch 30*a* associated with the intermediate position according to FIG. 10.

Figure 12:
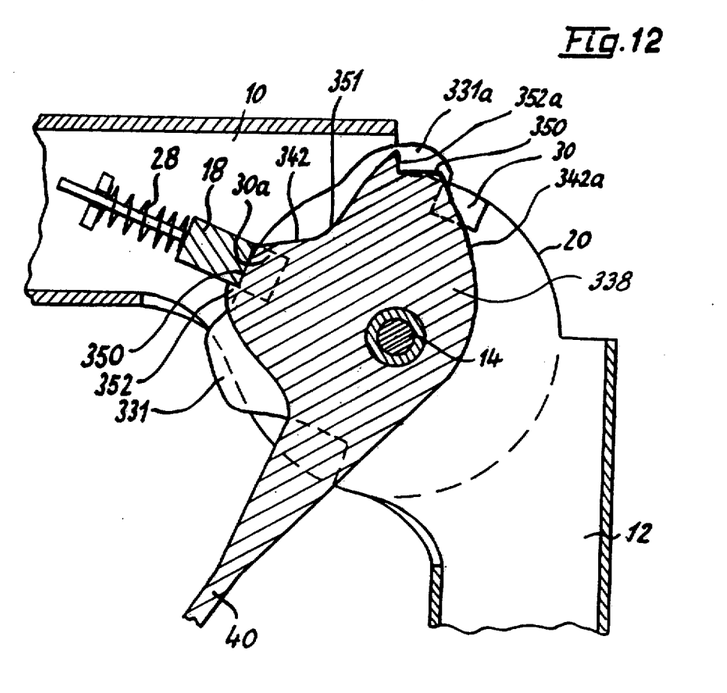
FIG. 12 shows an embodiment similar to the construction of FIG. 10 in cross-section and unlocked.

Accordingly, the joint shown in FIGS. 10 and 11 after opening, is able to effect an automatic locking, first in the intermediate position, and then after the unlocking lever is actuated provide a further opening movement in the extended position to the collapsed position. Such a mode of operation is in itself desirable. However, if bolt 18 is to engage in notch 30a when the joint is folded as well as when the joint is opened, then the embodiment of FIG. 12 may be chosen in which peripheral edge 20 is provided with a further cam-like projection 331*a*. The unlocking lever is provided with a second cam 342*a*, and at the end thereof with an end portion 350*a* and a stop nose 352*a*. The position according to FIG. 12 corresponds to the joint position according to FIG. 10. Bolt 18 is pressed outwardly by cam 342, and bears on end portion 350. If the joint is pivoted out of this position into its extended position, the frictional connection causes unlocking lever 338 to participate in this pivotal movement. Second cam-like projection 331 ensures at the same time that bolt 18 will slide over nose 352*a* and only thereafter drop into notch 30. If on the other hand, the joint is to be completely folded together out of the position shown in FIG. 12, then the procedure is exactly the same as that already described in conjunction with FIG. 10. When the joint is folded together out of the extended position, unlocking lever 338 is pivoted until bolt 18 bears on nose 352*a*. If second arm 12 is then pivoted counter-clockwise against first arm 10, cam-like projection 331*a* moves under bolt 18 and presses the latter radially outwardly to such an extent that the stop of bolt 18 at nose 352*a* is cancelled. At this instant, a relative movement has taken place between second arm 12 and unlocking lever 338 so that a radial depression 351 disposed between first cam 342 and nose 352 lies in the region of notch 30*a*. The bolt 18 can drop into notch 30*a* as soon as the latter comes into the region thereof. The joint is thus also locked during folding in the intermediate position according to FIG. 12. If ladder joints are required which have three different lockable positions, joint constructions as shown in FIGS. 13–16, or 17 and 18 are used.

Figure 13:
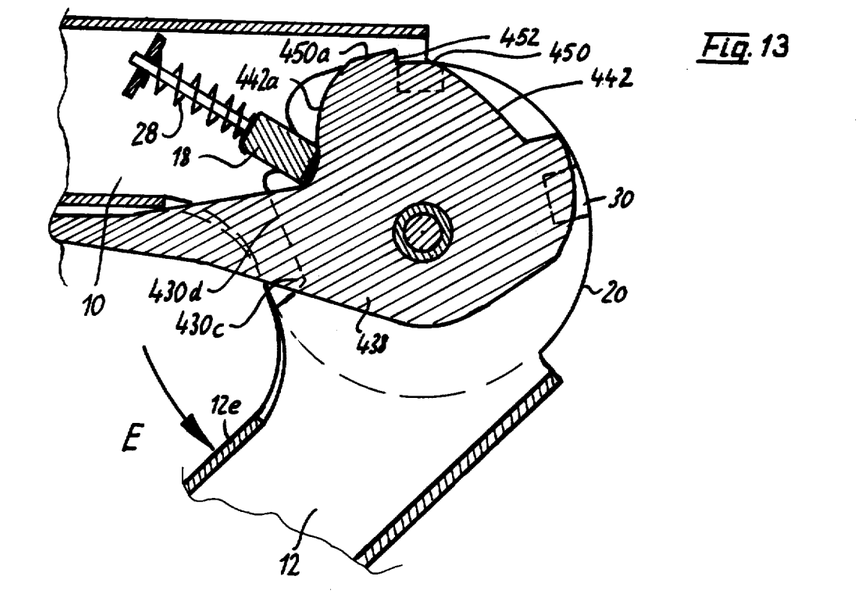
FIG. 13 shows a cross-section through a further embodiment of a joint according to the invention in a trestle position and in the locked condition.

In FIGS. 13, the first intermediate position of a joint is shown after it is opened from the collapsed position. Unlocking lever 438 is frictionally coupled with second arm 12 corresponding to the construction shown in FIG. 11. Provided on the unlocking lever are two oppositely rising cams 442 and 442*a* each of which terminate in an end portion 450 and 450*a* respectively, extending substantially tangential with respect to axis 14. The two end portions have a greater distance from axis 14 than circular peripheral edge 20, and the radial distances of end portions 450 and 450*a* from the joint axis are different so that a radial stop edge 452 is formed between the adjacent end portions.

Figure 14:
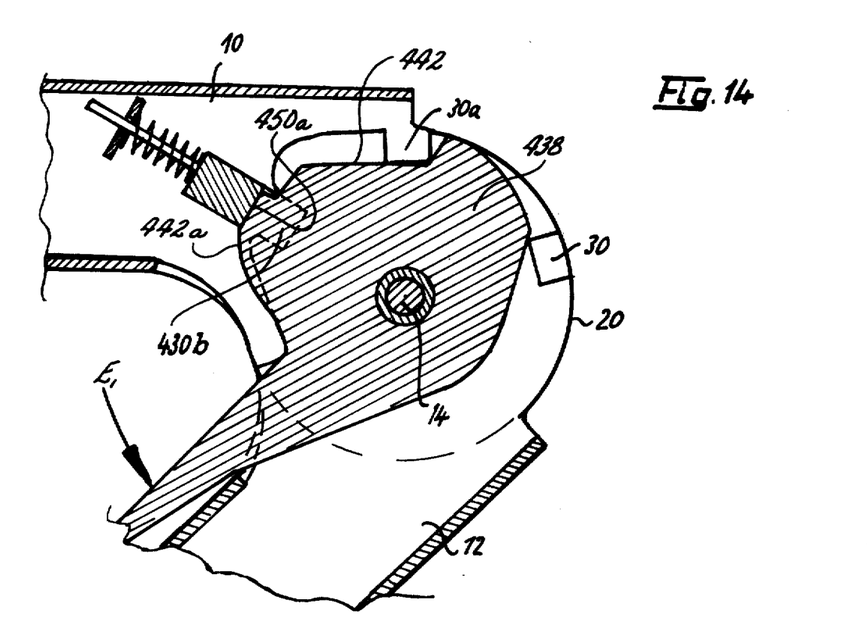
FIG. 14 shows the joint of FIG. 13 in the unlocked position.
Figure 15:
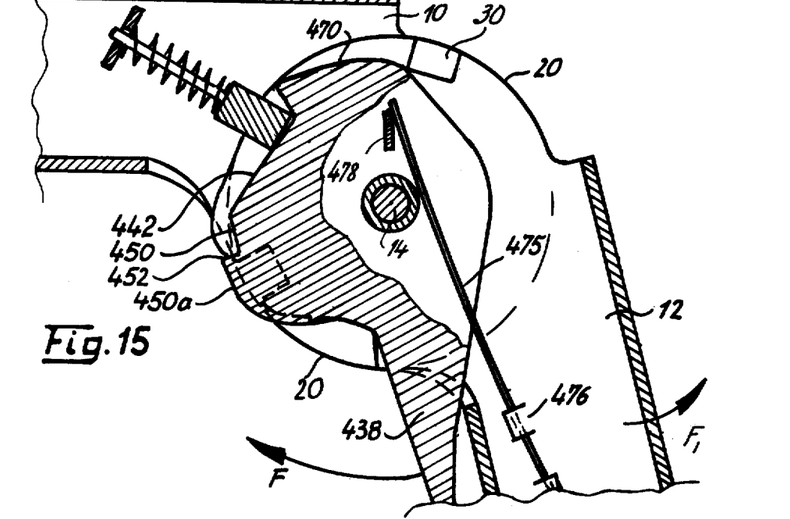
FIG. 15 shows a modification of the joint according to FIGS. 13 and 14 amplified by a return spring and locked in an intermediate position.

With the joint in the collapsed position, bolt 18 lies in a notch 430*c* associated with said position. If second arm 12 is moved relative to first arm 10 out of the collapsed position until it assumes the position shown in FIG. 13, bolt 18 first slides outwardly along an inclined flank 430*d* of notch 430*c*, and then engages notch 430*b* (notch 430b more clearly seen in FIG. 4) which is associated with the position shown in FIG. 13. During this pivotal movement of second arm 12, cam 442*a* of unlocking lever 438 bears on bolt 18 and unlocking lever 438 is held in the initial position shown in FIG. 13 since the frictional entrainment cannot overcome the force of spring 28. If the joint is to be further opened, the unlocking lever is pivoted in the direction of arrow $E_1$ in FIG. 14. Cam 442*a* then presses bolt 18 radially outward until the latter bears on end portion 450*a*. In this position of unlocking lever 438, the latter is prevented by second arm 12 from executing a further pivotal movement. The second arm can now be further pivoted in the direction of arrow $E_1$. Unlocking lever 438 can also participate in the pivotal movement under the action of the frictional connection. As soon as notch 30*a* comes into the region of bolt 18, the latter drops into the notch and again locks the joint in the position reached. This position is shown in FIG. 15.

If the joint is to be pivoted into its fully extended position, unlocking lever 438 is pivoted in the direction of arrow F (FIG. 15) until stop edge 452 bears on bolt 18. Bolt 18 then lies on end portion 450 of cam 442 which during the pivotal movement of the unlocking lever, has pressed the bolt outwardly in the radial direction. Second arm 12 can now be further pivoted in the direction of arrow $F_1$ until it reaches its extended position. Unlocking lever 438 (which now obtains position in FIG. 16), is also moved in this direction by the frictional entrainment and bolt 18 slides along peripheral edge 20 until it finally engages into notch 30. Bolt 18 presses onto inclined face 470 on unlocking lever 438, and pivots the latter against second arm 12. To fold the joint together, unlocking lever 438 is pivoted in the extended joint position shown in FIG. 16 in the direction of arrow $F_2$ until edge 452 bears on bolt 18. Second arm 12 can now be pivoted with respect to first arm 10 in the direction of arrow F until the second arm 12 finally bears on grip 440 of unlocking lever 438, and pivoting the lever in direction $F_2$. To permit this, bolt 18 has been lifted by a cam-like projection 451 extending radially outwardly from peripheral edge 20 until stop edge 452 can pass beneath bolt 18. In this manner, the joint may be pivoted into its fully collapsed position from the extended position without locking in the intermediate positions.

Figure 16:
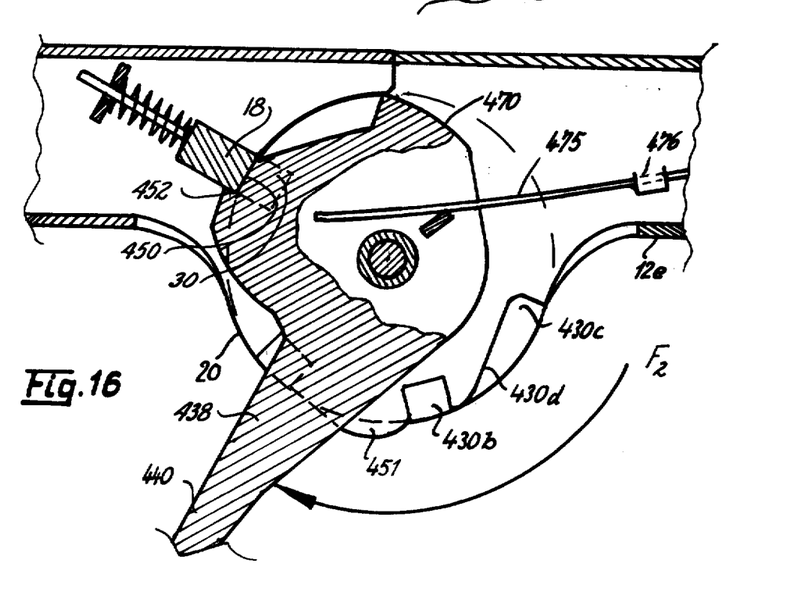
FIG. 16 shows the joint of FIG. 15 in the extended and unlocked condition.

Since it is desirable with ladder joints to have a visual indication that the joint has been locked, the arrangement is such that in the locked position, grip 440 of unlocking lever 438 always extends parallel to one of arms 10 or 12. If, for example, inclined face 470 is not sufficient to pivot the lever into this position, a leaf spring 475 may be provided which is fixedly secured at point 476 to second arm 12 and which with its free end, presses onto a stop 478 on unlocking lever 438 and tends to move the latter into the desired position. This construction is seen in FIG. 16. If only one predetermined locking position is provided, as is the case in FIG. 4, instead of a leaf spring, a torsion spring may be used and arranged concentrically to axis 14. It is apparent from the examples of embodiments described that the joints according to the invention have many different and varied uses, and are in no way limited to ladders or the like. They may, for example, also be used for swing windows, adjustment of the backs of vehicle seats, and camp beds.

Figure 17:
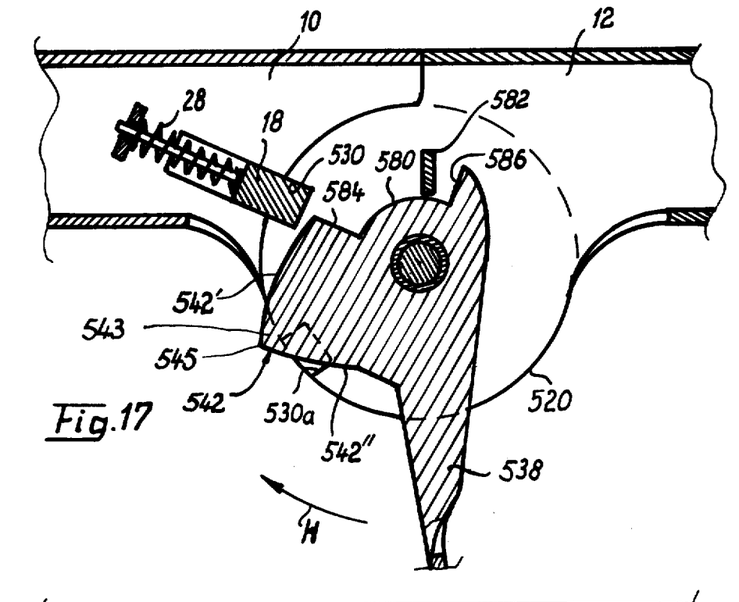
FIG. 17 shows a further embodiment in a locked condition.
Figure 20:
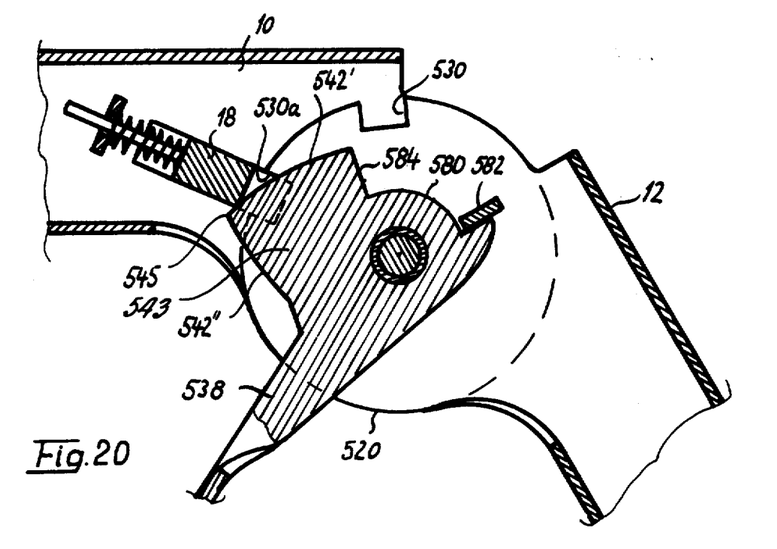
FIG. 20 shows the joint position of FIG. 19 in an unlocked condition.

Although the particularly simple construction shown in FIGS. 17 and 20 is not suitable for ladders, it may be used to save costs in all cases where the particular position of the outwardly projecting grip of the unlocking level is of no special significance.

Referring now to FIGS. 17–20 a joint lockable in two positions is shown with which notches 530 and 530a are associated. Control curve 542 on unlocking lever 538 forms a cam 543, apex 545 of which projects outwardly beyond peripheral edge 520. Up to this apex 545, the cam rises eccentrically in two portions 542' and 542", symmetrically with respect to a radius intersecting apex 545. In the region of a cutout 580 having the shape of an angular sector of unlocking lever 538, a stop 582 is provided on second arm 12 and cooperates with the two radial end edges 584 and 586 of cutout 580, and limits the pivotal movement of unlocking lever 538. In the locked condition of the joint, apex 545 lies in the region between the notches 530 and 530a so that each cam portion 542' and 542" faces a notch but is remote from the other notch.

Figure 18:
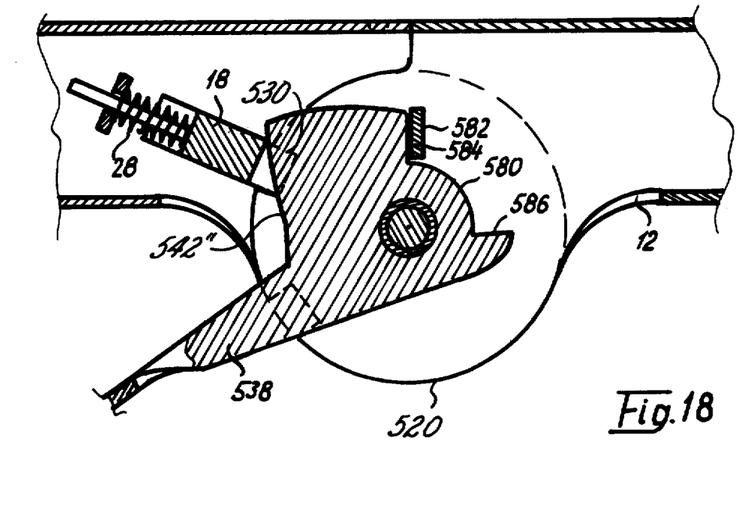
FIG. 18 shows the same joint position and unlocked, the extended position being shown in each case.
Figure 19:
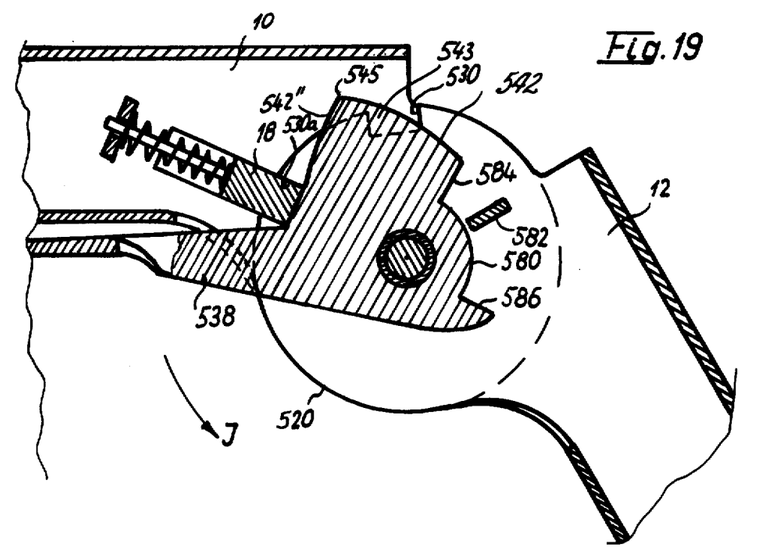
FIG. 19 shows an angled position of the joint of FIG. 17 in the locked condition.

When the unlocking lever is then pivotd, portion 542' in FIG. 17 approaches notch 530 facing the portion and bolt 18 engages in the notch. Cam portion 542' pushes bolt 18 gradually radially outward until it leaves notch 530, whereupon apex 545 passes beneath bolt 18. Bolt 18 then slides radially inward under the influence of spring 28 along cam portion 542' until end edge 584 bears on stop 582 and prevents further pivotal movement of unlocking lever 538. In this position, which is shown in FIG. 18, cam portion 542" still intersects peripheral edge 520 in the region of notch 530 so that bolt 18 doesn't enter the notch and the joint is thus in a stable, unlocked position. Second arm 12 can now be pivoted out of the position shown in FIG. 18 into that shown in FIG. 19, and during the initial pivotal movement, bolt 18 pushes lever 538 after stop 582 and will thus move completely up to peripheral edge 520 without being able to engage in notch 530, because the latter has meanwhile shifted with respect to the path of movement of the bolt. When the other notch 530a then reaches the region of bolt 18, the latter drops into the other notch and locks the joint in the second position as apparent from FIG. 19.

Since cam portion 542' has lifted bolt 18 out of notch 530, portion 542' is also denoted as lift portion for notch 530, and portion 542" may be referred to as blocking portion with respect to notch 530. In a joint having only one locking position, an unlocking lever having only one lift and one locking portion would be sufficient. However, in the example of the embodiment described, a lift portion and a blocking portion must also be associated with notch 530a. This is simply performed, in that for notch 530a, portion 542" serves as lift portion and portion 542' as blocking portion. When unlocking lever 538 is pivoted, starting at the positon according to FIG. 19 in the direction of arrow J and thus opposite to unlocking movement H in the joint position of FIG. 17, bolt 18 slides outwardly along flank 542" and finally passes apex 545 and bears outside peripheral edge 520 on portion 542'. A further pivotal movement of the unlocking lever is prevented by end edge 586 bearing on stop 582.

As is readily apparent, the principle explained with reference to FIGS. 17 to 20 may also be applied to joints having more than two lockable positions. It is then necessary to provide a cam formed by two oppositely rising eccentric portions between every two adjacent notches. The number of cams is thus one less than the number of notches. Assuming, for example, that a third lockable position is present which is reached by pivoting second arm 12 clockwise in FIG. 20, then during this pivotal movement, stop 582 will move unlocking lever 538 in the same sense, apex 545 thus being pushed through and beneath bolt 18. As soon as this third locking position of the joint has been reached, bolt 18 is in a region between cam 543 shown in the drawing, and a second cam of the same form provided on the unlocking lever, following the first in the clockwise direction and spaced therefrom. To enable the bolt to be lifted out of this third locked joint position, the unlocking lever must be pivoted in the clockwise direction in order to bring the second cam into an unlocking position with respect to bolt 1. This position is shown in FIG. 18 for first cam 543. The joint may now be pivoted by moving second arm 12 counter-clockwise towards the position according to FIG. 19, as in FIG. 18, wherein stop 582 bears on end edge 584, pushing the apex of the second cam beneath bolt 18. Alternatively, the joint may be pivoted by moving second arm 12 clockwise towards a fourth locked position in which bolt 18 engages a fourth notch from which it may be disengaged by pivotal movement of unlocking lever 538 counter-clockwise so that the second cam then assumes with respect to bolt 18, a position as shown in FIG. 20 for first cam 543. The joint can now be further pivoted towards the third joint position described.

It is apparent from the above description that depending upon the diameter of peripheral edge 520, the width of the notches and their depth can be suitably matched to obtain sufficient space in the peripheral direction for the third cam, and a fifth and sixth lockable joint position. Theoretically, still more joint positions may be provided. The pivot range of unlocking lever 538 depends on the uniform division between the individual notches, and is dependent on the number of notches. When the number of notches increases, their mutual spacing becomes smaller and the pivot range also decreases. The end points thereof are shown in FIGS. 18 and 20 with respect to adjacent notches.

For certain applications, this joint construction is advantageous because the joint, after unlocking, initially remains in the unlocked position until it is pivoted in one or the other direction to the next joint position. Locking then is possible at any time without special provision.

While only a few embodiments of the present invention have been shown and described, it will be obvious that many changes and modifications may be made thereunto without departing from the spirit and scope of the invention.

What is claimed is:

1. A joint having two arms pivotable about a common axis and lockable with respect to each other in at least one predetermined angular position comprising:
    a locking member mounted on one arm for radial movement with respect to the joint axis;
    a peripheral edge on the second arm extending concentrically from the joint axis and having a plurality of notches formed on the edge;
    spring means biasing said locking member towards said peripheral edge,
    an unlocking lever pivoted about the joint axis relative to the joint arms and having a substantially eccentric control curve for engaging said locking member and rising above the peripheral edge of the second arm, wherein the control curve includes a lift portion which in the locked condition of the joint, faces one of the notches and increases eccentrically its center distance, and when above the periphral edge the control curve passes through a point of maximum center distance and then in a blocking portion remote from the notches in the locked condition of the joint, the center distance thereof decreasing to form a cam portion, the unlocking movement of said unlocking lever relative to the second joint arm being limited so that the blocking portion upon reaching the end position of the unlocking lever in its unlocking position faces the notches and crosses said peripheral edge radially outward in the region of the notches, one of the notches in said peripheral edge of the second arm being radially aligned with said locking member when in one end position of the joint, and having a rear flank bevelled for receiving the locking member during rotation of the second arm into the other end position of the joint so that during rotation, said locking member can slide on and out the rear flank, and
    means for frictionally connecting said unlocking lever to the second joint arm.

2. The joint as claimed in claim 1 wherein said unlocking lever in its locking position bears in the direction opposite to its unlocking movement on the second joint arm, a cam stop formed on the end portion of the control curve and engaging the locking member in the direction of the unlocking movement of the unlocking lever when the unlocking lever has reached its unlocking position, a cam-like projection formed on said second arm and extending radially further from the joint axis than said cam stop and disposed so that said cam-like projection reaches the region of the locking member before the second joint arm reaches the unlocking lever when the joint is unlocked during the pivotal movement of the second joint arm directed against (the) said unlocking lever.

3. The joint as claimed in claim 1 comprising an axial biasing spring pressing said unlocking lever and the second joint arm against each other, axial projections formed in the contacting side faces of said unlocking lever and the second joint arm to increase the force of the biasing spring in a certain angular position of the unlocking lever in contact with the second joint arm.

4. A joint having two arms pivotable about a common axis and lockable with respect to each other in at least one predetermined angular position comprising:
    a locking member mounted on one arm for radial movement with respect to the joint axis;
    a peripheral edge on the second arm extending concentrically from the joint axis and having at least one notch formed on the edge;
    spring means biasing said locking member towards said peripheral edge;
    an unlocking lever pivoted about the joint axis relative to the joint arms having a substantially eccentric cam facing said locking member and rising over said peripheral edge into an end portion which blocks movement of said locking member at right angles when said unlocking lever is disposed in the unlocked position;
    means for frictionally coupling said unlocking lever to the second joint arm;
    a plurality of notches formed in the peripheral edge of the second joint arm, each of said plurality of notches defining a lockable position of the joint when engaged by said locking member;
    a stop on the second joint arm for engaging said unlocking lever;
    two cams oppositely formed on said unlocking lever so that their end portions are adjacent each other, the end portion of the first cam having a larger distance from the center of the joint axis than the end portion of the second cam to form a radial stop between the two end portions facing the second cam, wherein in a first end position the first cam bears on the locking member, and when the second joint arm is in the intermediate position following said first end position, and said unlocking lever bears on the second hinge arm, the end portion of said first cam engages the locking member; and
    a cam-like projection at the peripheral edge of the second joint arm associated with the end portion of the first cam, said cam-like projection extending radially further from the joint axis than said end portion of the first cam so that said projection reaches the locking member when the joint is unlocked and the second joint arm, directed against the unlocking lever, is pivotably moved.

* * * * *